(12) United States Patent
Roth et al.

(10) Patent No.: US 10,084,818 B1
(45) Date of Patent: Sep. 25, 2018

(54) FLEXIBLY CONFIGURABLE DATA MODIFICATION SERVICES

(75) Inventors: Gregory B. Roth, Seattle, WA (US); Graeme D. Baer, Seattle, WA (US); Eric Jason Brandwine, Haymarket, VA (US)

(73) Assignee: Amazon Technologies, Inc., Seattle, WA (US)

( * ) Notice: Subject to any disclaimer, the term of this patent is extended or adjusted under 35 U.S.C. 154(b) by 243 days.

(21) Appl. No.: 13/491,403

(22) Filed: Jun. 7, 2012

(51) Int. Cl.
*G06F 15/173* (2006.01)
*H04L 29/06* (2006.01)

(52) U.S. Cl.
CPC ............ *H04L 63/20* (2013.01); *G06F 15/173* (2013.01)

(58) Field of Classification Search
CPC ......... G06F 12/00; H04L 63/20; G06Q 10/06; G06Q 10/0631
USPC .......................................................... 709/226
See application file for complete search history.

(56) References Cited

U.S. PATENT DOCUMENTS

| | | | |
|---|---|---|---|
| 4,782,517 A * | 11/1988 | Bernardis et al. | ....... 379/201.05 |
| 4,868,877 A | 9/1989 | Fischer | |
| 4,908,759 A * | 3/1990 | Alexander et al. | |
| 4,918,728 A | 4/1990 | Matyas et al. | |
| 5,054,067 A | 10/1991 | Moroney et al. | |
| 5,146,498 A | 9/1992 | Smith | |
| 5,201,000 A | 4/1993 | Matyas et al. | |
| 5,495,533 A | 2/1996 | Linehan et al. | |
| 5,826,245 A | 10/1998 | Sandberg-Diment | |
| 5,862,220 A | 1/1999 | Perlman | |
| 6,012,144 A | 1/2000 | Pickett | |
| 6,195,622 B1 * | 2/2001 | Altschuler et al. | ............... 703/2 |
| 6,199,162 B1 | 3/2001 | Luyster | |
| 6,240,187 B1 | 5/2001 | Lewis | |
| 6,336,186 B1 | 1/2002 | Dyksterhouse et al. | |
| 6,356,941 B1 | 3/2002 | Cohen | |
| 6,505,299 B1 | 1/2003 | Zeng et al. | |
| 6,546,492 B1 | 4/2003 | Walker et al. | |
| 6,816,595 B1 | 11/2004 | Kudo | |
| 6,934,249 B1 * | 8/2005 | Bertin et al. | .................. 370/218 |
| 6,934,702 B2 | 8/2005 | Faybishenko et al. | |

(Continued)

FOREIGN PATENT DOCUMENTS

CN 1740944 3/2006
CN 101281578 10/2008
(Continued)

OTHER PUBLICATIONS

Chowdhury et al., "Network Virtualization: State of the Art and Research Challenges", IEEE Communications Magazine, Jul. 2009, 7 pages.

(Continued)

*Primary Examiner* — Joshua Joo
(74) *Attorney, Agent, or Firm* — Davis Wright Tremaine LLP (57) ABSTRACT

Techniques for processing data according to customer-defined rules are disclosed. In particular, methods and systems for implementing a data alteration service using one or resources of a distributed computing system are described. The data alteration service is flexibly configurable by entities using the distributed computing system, and may be used to augment, compress, filter or otherwise modify data crossing a customer boundary.

33 Claims, 6 Drawing Sheets

(56) References Cited

U.S. PATENT DOCUMENTS

| | | | |
|---|---|---|---|
| 7,149,698 B2* | 12/2006 | Guheen | G06Q 99/00 705/319 |
| 7,194,424 B2* | 3/2007 | Greer et al. | 705/14.66 |
| 7,295,671 B2 | 11/2007 | Snell | |
| 7,362,868 B2 | 4/2008 | Madoukh et al. | |
| 7,490,248 B1 | 2/2009 | Valfridsson et al. | |
| 7,565,419 B1 | 7/2009 | Kwiatkowski et al. | |
| 7,620,680 B1 | 11/2009 | Lamport | |
| 7,680,905 B1* | 3/2010 | Roberts et al. | 709/220 |
| 7,707,288 B2* | 4/2010 | Dawson | G06F 9/5072 709/224 |
| 7,716,240 B2 | 5/2010 | Lim | |
| 7,756,808 B2* | 7/2010 | Weigt et al. | 706/47 |
| 7,774,826 B1 | 8/2010 | Romanek et al. | |
| 7,865,446 B2 | 1/2011 | Armingaud et al. | |
| 7,877,607 B2 | 1/2011 | Circenis et al. | |
| 7,882,247 B2 | 2/2011 | Sturniolo et al. | |
| 7,894,604 B2 | 2/2011 | Nishioka et al. | |
| 7,894,626 B2 | 2/2011 | Wang et al. | |
| 7,937,432 B2* | 5/2011 | Rowley | 709/202 |
| 7,953,978 B2 | 5/2011 | Greco et al. | |
| 7,970,625 B2* | 6/2011 | Reicher et al. | 705/2 |
| 7,991,747 B1 | 8/2011 | Upadhyay et al. | |
| 7,992,055 B1 | 8/2011 | Agarwal et al. | |
| 8,024,562 B2 | 9/2011 | Gentry et al. | |
| 8,024,582 B2 | 9/2011 | Kunitz et al. | |
| 8,051,187 B2 | 11/2011 | Noy et al. | |
| 8,060,596 B1 | 11/2011 | Wootton et al. | |
| 8,065,720 B1 | 11/2011 | Ebrahimi et al. | |
| 8,091,125 B1 | 1/2012 | Hughes et al. | |
| 8,111,828 B2 | 2/2012 | Raman et al. | |
| 8,131,663 B1* | 3/2012 | Taylor | 706/59 |
| 8,140,679 B2* | 3/2012 | Hatanaka | 709/226 |
| 8,140,847 B1 | 3/2012 | Wu | |
| 8,185,931 B1 | 5/2012 | Reeves | |
| 8,213,602 B2 | 7/2012 | Mamidwar | |
| 8,219,869 B2* | 7/2012 | Ahn et al. | 714/748 |
| 8,224,796 B1 | 7/2012 | Shinde et al. | |
| 8,224,979 B2* | 7/2012 | Herz et al. | 709/229 |
| 8,230,050 B1* | 7/2012 | Brandwine | H04L 45/586 709/220 |
| 8,244,745 B2 | 8/2012 | Lim | |
| 8,245,037 B1 | 8/2012 | Durgin et al. | |
| 8,245,039 B2 | 8/2012 | Jones | |
| 8,251,283 B1 | 8/2012 | Norton | |
| 8,261,320 B1 | 9/2012 | Serenyl et al. | |
| 8,295,492 B2 | 10/2012 | Suarez et al. | |
| 8,296,434 B1* | 10/2012 | Miller | H04L 67/1029 709/220 |
| 8,302,170 B2 | 10/2012 | Kramer et al. | |
| 8,315,387 B2 | 11/2012 | Kanter et al. | |
| 8,321,560 B1 | 11/2012 | Pai et al. | |
| 8,387,127 B1 | 2/2013 | Narver et al. | |
| 8,443,367 B1* | 5/2013 | Taylor | G06F 9/52 718/1 |
| 8,468,455 B2* | 6/2013 | Jorgensen et al. | 715/733 |
| 8,494,168 B1 | 7/2013 | Tolfmans | |
| 8,538,020 B1 | 9/2013 | Miller | |
| 8,555,383 B1 | 10/2013 | Marshall et al. | |
| 8,565,108 B1 | 10/2013 | Marshall et al. | |
| 8,572,758 B1 | 10/2013 | Clifford | |
| 8,588,426 B2 | 11/2013 | Xin et al. | |
| 8,601,263 B1 | 12/2013 | Shankar et al. | |
| 8,607,358 B1 | 12/2013 | Shankar et al. | |
| 8,681,773 B2* | 3/2014 | Chazel et al. | 370/351 |
| 8,713,311 B1 | 4/2014 | Roskind | |
| 8,751,807 B2 | 6/2014 | Ma et al. | |
| 8,752,067 B2* | 6/2014 | Kishita | 719/313 |
| 8,804,950 B1 | 8/2014 | Panwar | |
| 8,850,516 B1 | 9/2014 | Hrebicek et al. | |
| 8,904,181 B1 | 12/2014 | Felsher et al. | |
| 8,950,005 B1* | 2/2015 | Torney | G06F 21/629 713/193 |
| 8,964,990 B1 | 2/2015 | Baer et al. | |
| 8,973,008 B2* | 3/2015 | Czajkowski | 709/226 |
| 8,989,379 B2 | 3/2015 | Katar et al. | |
| 9,031,240 B2 | 5/2015 | Yang et al. | |
| 9,053,460 B2* | 6/2015 | Gilbert | G06F 21/554 |
| 9,130,937 B1* | 9/2015 | Ostermann | H04L 63/0227 |
| 9,268,947 B1 | 2/2016 | Jarlstrom et al. | |
| 9,288,184 B1 | 3/2016 | Kvamme et al. | |
| 9,705,674 B2 | 7/2017 | Roth et al. | |
| 2001/0011226 A1* | 8/2001 | Greer et al. | 705/14 |
| 2001/0052071 A1 | 12/2001 | Kudo et al. | |
| 2002/0076044 A1 | 6/2002 | Pires | |
| 2002/0078361 A1 | 6/2002 | Giroux et al. | |
| 2002/0135611 A1* | 9/2002 | Deosaran et al. | 345/738 |
| 2002/0141590 A1 | 10/2002 | Montgomery | |
| 2003/0021417 A1 | 1/2003 | Vasic et al. | |
| 2003/0079120 A1 | 4/2003 | Hearn et al. | |
| 2003/0081790 A1 | 5/2003 | Kallahalla et al. | |
| 2003/0084290 A1 | 5/2003 | Murty et al. | |
| 2003/0093694 A1 | 5/2003 | Medvinsky et al. | |
| 2003/0131238 A1 | 7/2003 | Vincent | |
| 2003/0163701 A1 | 8/2003 | Ochi et al. | |
| 2003/0172269 A1 | 9/2003 | Newcombe | |
| 2003/0188181 A1 | 10/2003 | Kunitz et al. | |
| 2003/0188188 A1 | 10/2003 | Padmanabhan et al. | |
| 2004/0009815 A1 | 1/2004 | Zotto et al. | |
| 2004/0093499 A1 | 5/2004 | Arditi et al. | |
| 2004/0107345 A1 | 6/2004 | Brandt et al. | |
| 2004/0143733 A1 | 7/2004 | Ophir et al. | |
| 2004/0193915 A1 | 9/2004 | Smith et al. | |
| 2004/0215987 A1 | 10/2004 | Farkas et al. | |
| 2004/0223608 A1 | 11/2004 | Oommen et al. | |
| 2005/0004978 A1* | 1/2005 | Reed et al. | 709/203 |
| 2005/0010760 A1 | 1/2005 | Goh et al. | |
| 2005/0021712 A1* | 1/2005 | Chassapis et al. | 709/223 |
| 2005/0050317 A1 | 3/2005 | Kramer et al. | |
| 2005/0120232 A1 | 6/2005 | Hori et al. | |
| 2005/0149677 A1* | 7/2005 | Shimada et al. | 711/114 |
| 2005/0165859 A1 | 7/2005 | Geyer et al. | |
| 2005/0195743 A1 | 9/2005 | Rochberger et al. | |
| 2005/0246778 A1 | 11/2005 | Usov et al. | |
| 2005/0273629 A1 | 12/2005 | Abrams et al. | |
| 2006/0010323 A1 | 1/2006 | Martin et al. | |
| 2006/0018468 A1 | 1/2006 | Toba et al. | |
| 2006/0021018 A1 | 1/2006 | Hinton et al. | |
| 2006/0031301 A1* | 2/2006 | Herz et al. | 709/206 |
| 2006/0123010 A1* | 6/2006 | Landry et al. | 707/10 |
| 2006/0143685 A1 | 6/2006 | Vasishth et al. | |
| 2006/0155829 A1* | 7/2006 | Annic | 709/220 |
| 2006/0168248 A1* | 7/2006 | Sack | 709/228 |
| 2006/0190724 A1 | 8/2006 | Adams | |
| 2006/0195575 A1* | 8/2006 | Delany et al. | 709/225 |
| 2006/0204003 A1 | 9/2006 | Takata et al. | |
| 2006/0206932 A1 | 9/2006 | Chong | |
| 2006/0288232 A1 | 12/2006 | Ho et al. | |
| 2006/0291664 A1 | 12/2006 | Suarez et al. | |
| 2007/0033637 A1 | 2/2007 | Yami et al. | |
| 2007/0050641 A1 | 3/2007 | Flynn et al. | |
| 2007/0055862 A1 | 3/2007 | Sharma et al. | |
| 2007/0055921 A1* | 3/2007 | Challenor | 715/500 |
| 2007/0140480 A1 | 6/2007 | Yao | |
| 2007/0143851 A1* | 6/2007 | Nicodemus | G06F 21/55 726/25 |
| 2007/0150480 A1* | 6/2007 | Hwang et al. | 707/10 |
| 2007/0157288 A1* | 7/2007 | Lim | G06F 21/6218 726/1 |
| 2007/0179987 A1 | 8/2007 | Lim | |
| 2007/0180153 A1 | 8/2007 | Cornwell et al. | |
| 2007/0198656 A1* | 8/2007 | Mazzaferri et al. | 709/218 |
| 2007/0230706 A1 | 10/2007 | Youn | |
| 2007/0239987 A1* | 10/2007 | Hoole et al. | 713/169 |
| 2007/0283446 A1 | 12/2007 | Yami et al. | |
| 2008/0005024 A1 | 1/2008 | Kirkwood | |
| 2008/0019516 A1 | 1/2008 | Fransdonk | |
| 2008/0019527 A1 | 1/2008 | Youn et al. | |
| 2008/0022376 A1 | 1/2008 | Ke et al. | |
| 2008/0025514 A1 | 1/2008 | Coombs | |
| 2008/0034200 A1* | 2/2008 | Polcha et al. | 713/153 |
| 2008/0046984 A1 | 2/2008 | Bohmer et al. | |
| 2008/0082827 A1 | 4/2008 | Agrawal et al. | |

(56) References Cited

U.S. PATENT DOCUMENTS

| | | |
|---|---|---|
| 2008/0084996 A1 | 4/2008 | Chen et al. |
| 2008/0112561 A1 | 5/2008 | Kim |
| 2008/0127279 A1 | 5/2008 | Futa et al. |
| 2008/0172562 A1 | 7/2008 | Cachin et al. |
| 2008/0247540 A1 | 10/2008 | Ahn et al. |
| 2008/0294711 A1 | 11/2008 | Barber |
| 2008/0298590 A1 | 12/2008 | Katar et al. |
| 2008/0319909 A1 | 12/2008 | Perkins et al. |
| 2009/0025087 A1 | 1/2009 | Peirson, Jr. et al. |
| 2009/0034733 A1 | 2/2009 | Raman et al. |
| 2009/0092252 A1 | 4/2009 | Noll et al. |
| 2009/0106552 A1 | 4/2009 | Mohamed |
| 2009/0158033 A1 | 6/2009 | Jeong et al. |
| 2009/0158430 A1 | 6/2009 | Borders |
| 2009/0165076 A1 | 6/2009 | DeCusatis et al. |
| 2009/0165114 A1* | 6/2009 | Baum et al. ............... 726/12 |
| 2009/0232300 A1 | 9/2009 | Zuker et al. |
| 2009/0241114 A1 | 9/2009 | Kirihata |
| 2009/0245519 A1 | 10/2009 | Cachin et al. |
| 2009/0274300 A1 | 11/2009 | Tou et al. |
| 2009/0276364 A1* | 11/2009 | Iaia et al. ............... 705/80 |
| 2009/0276514 A1 | 11/2009 | Subramanian |
| 2009/0300356 A1 | 12/2009 | Crandell |
| 2010/0008499 A1 | 1/2010 | Lee et al. |
| 2010/0014662 A1 | 1/2010 | Jutila |
| 2010/0017626 A1 | 1/2010 | Sato et al. |
| 2010/0036779 A1 | 2/2010 | Sadeh-Koniecpol et al. |
| 2010/0074445 A1 | 3/2010 | Nefedov et al. |
| 2010/0088126 A1* | 4/2010 | Iaia et al. ............... 705/5 |
| 2010/0115614 A1 | 5/2010 | Barile et al. |
| 2010/0138218 A1 | 6/2010 | Geiger |
| 2010/0146269 A1 | 6/2010 | Baskaran |
| 2010/0153670 A1 | 6/2010 | Dodgson et al. |
| 2010/0161830 A1 | 6/2010 | Noy et al. |
| 2010/0162347 A1 | 6/2010 | Barile |
| 2010/0165876 A1 | 7/2010 | Shukla et al. |
| 2010/0185863 A1 | 7/2010 | Rabin et al. |
| 2010/0211781 A1 | 8/2010 | Auradkar et al. |
| 2010/0235635 A1 | 9/2010 | Kshirsagar et al. |
| 2010/0242088 A1 | 9/2010 | Thomas |
| 2010/0254537 A1 | 10/2010 | Buer et al. |
| 2010/0266132 A1 | 10/2010 | Bablani et al. |
| 2010/0268788 A1* | 10/2010 | Arimilli et al. ............... 709/213 |
| 2010/0269171 A1 | 10/2010 | Raz et al. |
| 2010/0299313 A1 | 11/2010 | Orsini et al. |
| 2010/0303241 A1 | 12/2010 | Breyel |
| 2010/0306850 A1 | 12/2010 | Barile et al. |
| 2010/0316219 A1 | 12/2010 | Boubion et al. |
| 2010/0325732 A1 | 12/2010 | Mittal et al. |
| 2010/0332401 A1 | 12/2010 | Prahlad et al. |
| 2011/0022642 A1 | 1/2011 | deMilo et al. |
| 2011/0072264 A1 | 3/2011 | McNulty |
| 2011/0083190 A1 | 4/2011 | Brown et al. |
| 2011/0099362 A1 | 4/2011 | Haga et al. |
| 2011/0113466 A1 | 5/2011 | Stringham et al. |
| 2011/0113467 A1 | 5/2011 | Agarwal et al. |
| 2011/0116636 A1 | 5/2011 | Steed |
| 2011/0154031 A1 | 6/2011 | Banerjee et al. |
| 2011/0154057 A1 | 6/2011 | England et al. |
| 2011/0173435 A1 | 7/2011 | Liu et al. |
| 2011/0178933 A1 | 7/2011 | Bailey |
| 2011/0191462 A1 | 8/2011 | Smith |
| 2011/0209064 A1* | 8/2011 | Jorgensen et al. ............... 715/733 |
| 2011/0213971 A1 | 9/2011 | Gurel et al. |
| 2011/0225431 A1 | 9/2011 | Stufflebeam, Jr. et al. |
| 2011/0244440 A1* | 10/2011 | Saxon et al. ............... 434/362 |
| 2011/0246765 A1 | 10/2011 | Schibuk |
| 2011/0252071 A1 | 10/2011 | Cidon |
| 2011/0258443 A1 | 10/2011 | Barry |
| 2011/0270872 A1 | 11/2011 | Alvarez et al. |
| 2011/0289134 A1 | 11/2011 | de los Reyes et al. |
| 2011/0289314 A1 | 11/2011 | Whitcomb |
| 2011/0296497 A1 | 12/2011 | Becker |
| 2011/0320819 A1 | 12/2011 | Weber et al. |
| 2012/0036370 A1 | 2/2012 | Lim et al. |
| 2012/0042162 A1 | 2/2012 | Anglin et al. |
| 2012/0079289 A1 | 3/2012 | Weng et al. |
| 2012/0096272 A1 | 4/2012 | Jasper et al. |
| 2012/0124612 A1 | 5/2012 | Adimatyam et al. |
| 2012/0134495 A1 | 5/2012 | Liu |
| 2012/0140923 A1 | 6/2012 | Lee et al. |
| 2012/0144233 A1* | 6/2012 | Griffith et al. ............... 714/13 |
| 2012/0151551 A1 | 6/2012 | Readshaw et al. |
| 2012/0159148 A1 | 6/2012 | Behren et al. |
| 2012/0170753 A1 | 7/2012 | Pandrangi et al. |
| 2012/0173881 A1 | 7/2012 | Trotter et al. |
| 2012/0185913 A1 | 7/2012 | Martinez et al. |
| 2012/0191979 A1 | 7/2012 | Feldbau |
| 2012/0198042 A1 | 8/2012 | Dunbar et al. |
| 2012/0204032 A1 | 8/2012 | Wilkins et al. |
| 2012/0216041 A1 | 8/2012 | Naono et al. |
| 2012/0254090 A1* | 10/2012 | Burris et al. ............... 706/47 |
| 2012/0260094 A1 | 10/2012 | Asim et al. |
| 2012/0266218 A1 | 10/2012 | Mattsson |
| 2012/0281839 A1 | 11/2012 | Arnold et al. |
| 2012/0290850 A1 | 11/2012 | Brandt et al. |
| 2012/0291101 A1 | 11/2012 | Ahlstrom et al. |
| 2012/0297183 A1 | 11/2012 | Mukkara et al. |
| 2012/0297200 A1 | 11/2012 | Thom et al. |
| 2012/0300936 A1 | 11/2012 | Green |
| 2012/0303961 A1 | 11/2012 | Kean et al. |
| 2012/0311675 A1 | 12/2012 | Ham et al. |
| 2012/0314854 A1 | 12/2012 | Waters |
| 2012/0321086 A1 | 12/2012 | D'Zouza et al. |
| 2012/0323990 A1 | 12/2012 | Hayworth |
| 2013/0031255 A1 | 1/2013 | Maloy et al. |
| 2013/0031356 A1 | 1/2013 | Prince et al. |
| 2013/0044878 A1 | 2/2013 | Rich et al. |
| 2013/0047034 A1* | 2/2013 | Salomon ............... H04W 4/00 714/18 |
| 2013/0091350 A1 | 4/2013 | Gluck |
| 2013/0097320 A1* | 4/2013 | Ritter et al. ............... 709/226 |
| 2013/0103834 A1* | 4/2013 | Dzerve et al. ............... 709/225 |
| 2013/0111217 A1 | 5/2013 | Kopasz et al. |
| 2013/0157619 A1 | 6/2013 | Di Luoffo et al. |
| 2013/0159732 A1 | 6/2013 | Leoutsarakos |
| 2013/0163753 A1 | 6/2013 | MacMillan et al. |
| 2013/0166703 A1 | 6/2013 | Hammer et al. |
| 2013/0167196 A1* | 6/2013 | Spencer et al. ............... 726/3 |
| 2013/0198521 A1 | 8/2013 | Wu |
| 2013/0212576 A1* | 8/2013 | Huang et al. ............... 718/1 |
| 2013/0269035 A1 | 10/2013 | Bajaj et al. |
| 2013/0283045 A1 | 10/2013 | Li et al. |
| 2013/0290716 A1 | 10/2013 | Gavrilov |
| 2013/0312094 A1 | 11/2013 | Zecheru |
| 2013/0316682 A1 | 11/2013 | Vieira |
| 2013/0326233 A1 | 12/2013 | Tolfmans |
| 2014/0012751 A1 | 1/2014 | Kuhn et al. |
| 2014/0020072 A1 | 1/2014 | Thomas |
| 2014/0047549 A1 | 2/2014 | Bostley, III et al. |
| 2014/0122866 A1 | 5/2014 | Haeger et al. |
| 2014/0164774 A1 | 6/2014 | Nord et al. |
| 2014/0177829 A1 | 6/2014 | MacMillan et al. |
| 2015/0295941 A1* | 10/2015 | Lim ............... H04L 9/0822 713/165 |
| 2016/0224651 A1* | 8/2016 | Kumarasamy .... G06F 17/30581 |
| 2017/0142092 A1* | 5/2017 | Lim ............... H04L 63/083 |

FOREIGN PATENT DOCUMENTS

| | | |
|---|---|---|
| CN | 101573910 | 11/2009 |
| CN | 101741547 | 6/2010 |
| CN | 101753302 | 6/2010 |
| CN | 102130768 | 7/2011 |
| CN | 102318263 | 1/2012 |
| CN | 102656591 | 9/2012 |
| JP | 2000215240 | 4/2000 |
| JP | 2000295209 | 10/2000 |
| JP | 2005057417 | 3/2005 |
| JP | 2005258801 | 9/2005 |
| JP | 2005533438 | 11/2005 |
| JP | 2007081482 | 3/2007 |
| JP | 2007507760 | 3/2007 |
| JP | 2008015669 | 1/2008 |

(56) References Cited

FOREIGN PATENT DOCUMENTS

| | | |
|---|---|---|
| JP | 2008306418 | 12/2008 |
| JP | 2009213064 | 9/2009 |
| JP | 2009246800 | 10/2009 |
| JP | 2010128824 | 6/2010 |
| JP | 2011019129 | 1/2011 |
| JP | 2012073374 | 4/2012 |
| JP | 2013513834 | 4/2013 |
| JP | 2003188871 | 7/2013 |
| JP | 2014501955 | 1/2014 |
| KR | 101145766 | 5/2012 |
| WO | WO2004008676 | 1/2004 |
| WO | WO2010001150 | 1/2010 |
| WO | WO2010093559 | 8/2010 |
| WO | WO2011083343 | 7/2011 |
| WO | WO2012060979 | 5/2012 |
| WO | WO2012109640 | 8/2012 |
| WO | WO2013145517 | 3/2013 |

OTHER PUBLICATIONS

Chowdhury et al., "Virtual Network Embedding With Coordinated Node and Link Mapping", IEEE INFOCOM 2009, Apr. 2009, 9 pages.
International Search Report and Written Opinion mailed Apr. 29, 2014, in International Patent Application No. PCT/US2014/015404, filed Feb. 7, 2014.
International Search Report and Written Opinion mailed May 28, 2014, in International Patent Application No. PCT/US2014/15697, filed Feb. 11, 2014.
International Search Report and Written Opinion mailed May 30, 2014, in International Patent Application No. PCT/US2014/015408, filed Feb. 7, 2014.
International Search Report and Written Opinion mailed May 30, 2014, in International Patent Application No. PCT/US2014/015410, filed Feb. 7, 2014.
International Search Report and Written Opinion mailed May 30, 2014, International Patent Application No. PCT/US2014/015414, filed Feb. 7, 2014.
International Search Report and Written Opinion mailed Oct. 28, 2014, International Patent Application No. PCT/US2014/044861, filed Jun. 30, 2014.
Zhu et al., "Algorithms for assigning substrate network resources to virtual network components", IEEE INFOCOM 2006, Apr. 2006, 12 pages.
Bethencourt et al., "Ciphertext-Policy Attribute-Based Encryption," IEEE Symposium on Security and Privacy 2007, 15 pages.
IEEE, "Draft Standard for Identity-based Public-key Cryptography Using Pairings," IEEE P1363.3/D1, Apr. 2008, retrieved Sep. 22, 2015, from http://grouper.ieee.org/groups/1363/IBC/material/P1363.3-D1-200805.pdf, 85 pages.
Krawczyk et al., "HMAC-based Extract-and-Expand Key Derivation Function (HKDF)," Internet Engineering Task Force (IETF), May 2010, retrieved Sep. 22, 2015, from https://tools.ietf.org/html/rfc5869, 14 pages.
Rescorla, "Diffie-Hellman Key Agreement Method," Network Working Group, RTFM Inc., Jun. 1999, retrieved on Sep. 22, 2015, from https://tools.ietf.org/html/rfc2631, 13 pages.

Sieloff, "The new systems administrator: The role of becoming root," Inside Solaris, Oct. 2002, 8(10):6-9.
Wikipedia, "IEEE P1363" an Institute of Electrical and Electronics Engineers (IEEE) standardization project for public-key cryptography, retrieved Sep. 22, 2015, from https://en.wikipedia.org/wiki/IEEE_P1363, 3 pages.
Wikipedia, "Key derivation function," retrieved Sep. 22, 2015, from https://en.wikipedia.org/wiki/Key_derivation_function, 4 pages.
Itani et al., "Privacy as a Service: Privacy-Aware Data Storage and Processing in Cloud Computing Architectures," 2009 Eighth IEEE International Conference on Dependable, Autonomic and Secure Computing, pp. 711-716.
Bernstein et al., "The Poly1305-AES Message-Authentication Code," Lecture Notes in Computer Science, Department of Mathematics, Statistics, and Computer Science (M/C 249), The University of Illinois at Chicago, Feb. 21, 2005, 18 pages.
Guttman et al., "An Introduction to Computer Security: The NIST Handbook," Special Publication 800-12, Oct. 1, 1995, Sections 17.6 and 18.3.2 and Section 19 for cryptographic tools, XP055298016, retrieved on Aug. 26, 2016, from http://www.davidsalomon.name/CompSec/auxiliary/handbook.pdf.
Nikkei Trendy, "Simple Input of URL Using Hosts File," Nikkei Business Publications, Inc., Feb. 6, 2006, retrieved Dec. 21, 2016, from http://trendy.nikkeibp.co.jp/article/tec/winxp/20060131/115213/?45=nocnt, 5 pages.
Canadian Notice of Allowance for Patent Application No. 2,916,954 dated Dec. 19, 2017, 1 page.
Japanese Notice of Allowance for Patent Application No. 2015-558042, dated Dec. 27, 2017, 6 pages.
Chinese Decision on Rejection for Patent Application No. 201480011965.9 dated Jan. 15, 2018, 6 pages.
Chinese Notice on the Second Office Action for Patent Application No. 201480020517.5 dated Jan. 3, 2018, 8 pages.
Chinese Notice on Grant of Patent for Application No. 201480020500 dated Dec. 28, 2017, 4 pages.
Chinese First Office Action for Patent Application No. 201480020482.5, dated Dec. 28, 2017, 11 pages.
Manulis, et al., "Group Signatures: Authentication with Privacy," retrieved from https://www.bsi.bund.de/SharedDocs/Downloads/EN/BSI/Publications/Studies/GruPA/GruPA.pdf?_blob=publicationFile, Published May 15, 2010, 267 pages.
Japanese Notice and Report for Revocation of Reconsideration Report for Patent Application No. 2016-524288 dated Apr. 13, 2018, 6 pages.
Canadian Notice of Allowance for Patent Application No. 2,899,014 dated Feb. 8, 2018, 1 page.
Chinese First Office Action for Patent Application No. 201480046236.7, dated Feb. 24, 2018, 11 pages.
European Official Letter for Patent Application No. 14751881.5 dated Feb. 21, 2018, 3 pages.
Singapore Notice of Eligibility for Grant for Patent Application No. 11201510650U, dated Feb. 5, 2018, 3 pages.
Australian Examination Report No. 1 for Patent Application No. 2017204853 dated Jun. 29, 2018, 4 pages.
Canadian Office Action for Patent Application No. 2,898,995 dated Jul. 3, 2018, 9 pages.
Chinese Second Office Action for Patent Application No. 20148002048.5 dated Jul. 19, 2018, 17 pages.

* cited by examiner

FLEXIBLY CONFIGURABLE DATA MODIFICATION SERVICES

BACKGROUND

Large amounts of network data are generated and consumed in the course of modern electronic communication. Such data are often transmitted to and/or received from entities outside of the influence or control of customers, both at an enterprise level and at a granular and/or personal level. Such entities may require formatting, censorship, compliance or other requirements for incoming and outgoing data. However, the number of manifestations and combinations of such data requirements is nearly infinite, and it can be difficult to configure systems to modify, format, or otherwise alter data to meet such widely disparate sets of requirements. Additionally, such requirements may change on short notice, and necessary reconfiguration to meet the changed requirements can be burdensome.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for implementing a customer-configurable packet mangler or other data alteration service in and/or using a distributed computing system. In particular, a customer may specify certain rules by which various types of data, inbound and/or outbound from customer devices, may be modified, upon which various components of the distributed computing system are utilized to implement the rules, e.g., using packet mangling techniques. For example, the customer may specify that outbound data to specific external device types or locales must conform to a customer-provided specification (e.g., for regulatory compliance and/or performance optimization), upon which the distributed computing system determines the necessary alterations and data patterns (or other markers) to which they apply. Thereafter, in the example given, the implementation may include redirection of some or all of the network traffic between the customer and the external device in question to a component of the distributed computing system. Upon processing in the determined manner, the redirected data is thereupon relayed to the original destination. As will be contemplated, a similar process may be utilized for inbound network traffic.

In another example, the data alteration service may be effective to modify data transiting between two virtualized instances of the distributed computing system, one of which is controlled by a customer requesting the service, while the other is controlled by a different customer. A separate virtualized instance of the distributed computing system may be invoked to implement the customer-requested rules, or in some embodiments, the same instance from whence (or to which) the data desired to be modified may perform the actual modification, e.g., in a quarantine or "sandbox." It is contemplated that data transiting to or from any device or component controlled by a service-requesting customer, whether physical, virtual, aggregated or otherwise, to a device not under control by the customer (without regard to its nature), may be subject to packet mangling by the service. The service may, in some embodiments, be granularly controllable based on a number of criteria, including customer or external device type, geographic location, and the like.

An example implementation of such a data alteration service may include the generation of one or more policies that apply to some or all components involved in a given data transaction type. The policies, in some embodiments, are generated by the distributed computing system upon receipt of customer-defined rules, and may take into account data type, connected device type, customer characteristics, network topology, or any other characteristics relevant to the generation of an effective policy. Such policies, when broadcasted to the relevant devices, can ensure that all controlled devices (or a desired subset thereof) act to implement the associated customer-defined rules in a unified, predictable fashion. In embodiments where a customer controls a significant plurality of devices at varying levels of abstraction and/or access, such policies may also ensure that, e.g., mission-critical or strict rules take effect across all affected devices.

Figure 1:
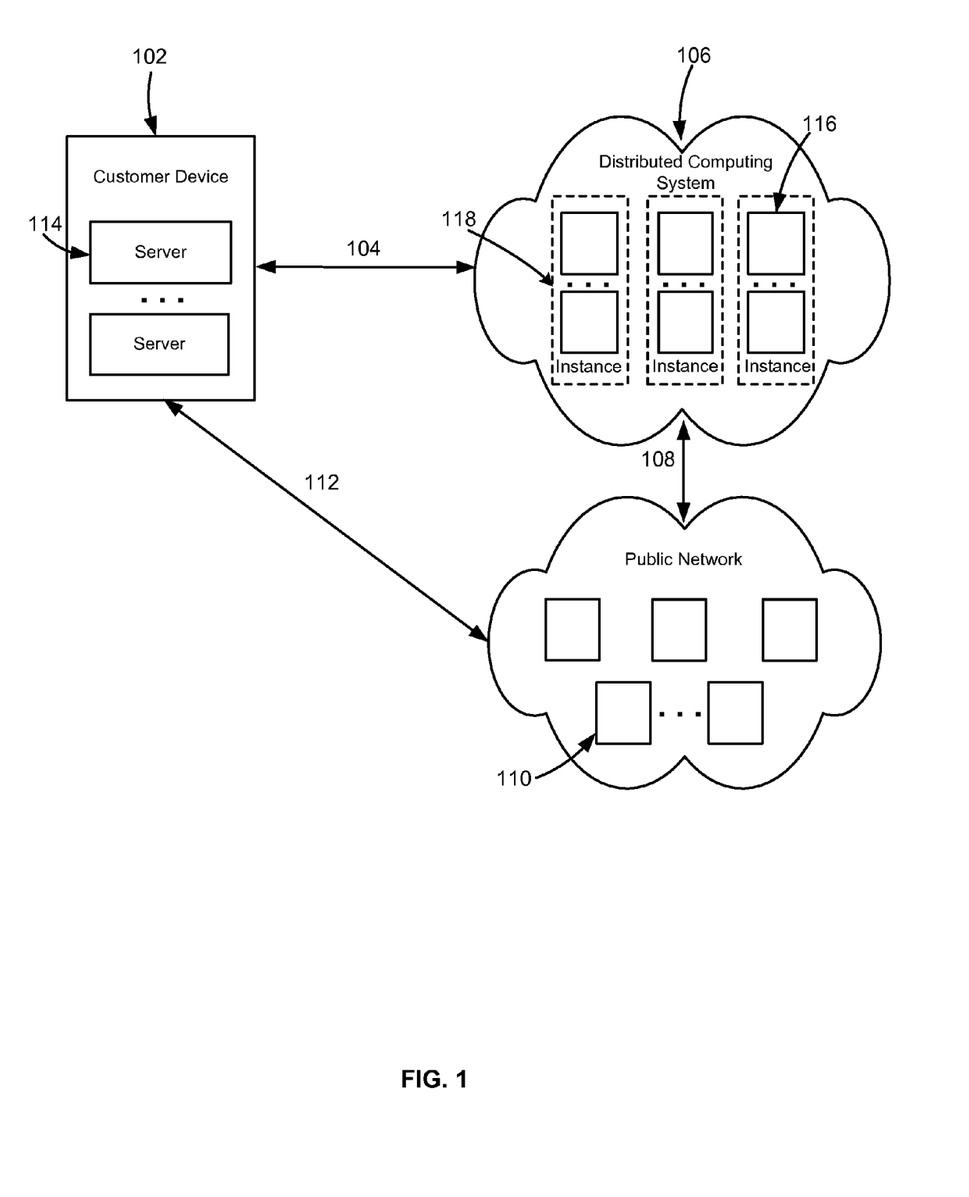
FIG. 1 shows an illustrative example of an environment for a flexibly configurable data alteration service in accordance with at least one embodiment.

FIG. 1 illustrates an example environment 100 that implements a data alteration service. One or more customer devices 102 connect, via data connection 104, to distributed computing system 106. The distributed computing system connects via public network connection 108 to one or more public network entities 110. The one or more customer devices may have a public network connection 112 to the public network, as illustrated. Customer devices may include datacenters, mainframes, individual computing devices, distributed computing environments, or other devices or groups of devices capable of communicating to other devices, such as the distributed computing system described herein, via data connections. In some embodiments, the customer device may consist of one or more servers 114 or other resources. As may be contemplated, such servers or similar resources may be networked and configured to support a distributed computing system. For example, a customer, such as an enterprise customer, may have a datacenter comprising multiple servers, some or all of which are interconnected via network connections. Customer devices, and devices in general, may include devices and/or resources of the distributed computing system, such as the resources 118 described below. The datacenter or constituents thereof may nominally connect to a public network, such as the Internet, via a public network connection (e.g., the public network connection 112 as illustrated). However, the customer device (e.g., datacenter) may require one or more data transformations to be effected upon traffic transiting across a boundary of the customer's control or influence. The customer device may wish to exert a given transformation regime upon traffic that is inbound from external devices (e.g., those which are outside of the customer's influence or control), or outbound from authorized resources, such as the constituent nodes 114 of customer device 102, to such external devices. In some embodiments, to transform transiting data in a manner prescribed by a customer or customer device, the customer or customer device may avail of a data modification service provided by the distributed computing system 106 in a manner herein described in further detail.

In some embodiments, the distributed computing system 106 consists of a plurality of networked computing resources 116, such as storage devices, servers, processors, network equipment, and the like. The networked computing resources are abstracted and/or grouped into virtualized or grouped resources 118 that consist of any portion or number of underlying networked computing resources, which in some embodiments includes physical hardware. For example, the virtualized or grouped resources may include guest operating systems that run in virtual machines enabled by a hypervisor with direct access to the hardware (e.g., a bare metal hypervisor). As another example, such virtualized or grouped resources may include relational databases, data storage and archival services and/or devices, distributed computing services and/or devices, or any level of abstraction thereof (e.g., physical machines, virtual machines, instances, and the like). Such virtualized resources may, in some embodiments, be exposed to a plurality of connecting customers, such as the customer or customer device described above. In some embodiments, the underlying networked computing resources from which the virtualized resources are derived are obfuscated to connecting customers. In some embodiments, the distributed computing system is capable of supporting a plurality of customers simultaneously connecting to the virtualized resources.

In some embodiments, such a distributed computing system may support the provision, using a virtualized resource, of a data modification service upon request of a customer. Such a request may be propagated by a customer, a customer device, or any constituent thereof by programmatic, graphical, automatic and/or manual invocation. For example, a customer may request the service via an application programming interface (API) or user interface (UI) provided by a provider of the distributed computing system and/or service provider. In some embodiments, rules may be provided by the customer as part of the service request, and/or separately from such a request, and in certain embodiments may be provided by the customer via a similar interface (e.g., an API or UI). The rules may be defined in any manner that the service and/or system is configured to receive. For example, rules may be formed using relational database queries such as structured query language (SQL) queries, artificial intelligence language and/or predicate logic notation, natural language, specialized languages developed specifically for the service, and the like. In some embodiments, the rules specify, to varying levels of granularity, desired alterations to transiting data, and may also specify the characteristics of devices or network traffic to which such alterations should apply.

In some embodiments, as previously mentioned, the rules are implemented by the service to apply to traffic transiting across a boundary of customer control or influence, e.g., between devices authorized by or for access by a customer and external devices without such authorization. In the illustrated example, a customer is authorized to access the constituents of customer device 102 (and vice versa), while devices 110 across the public network and external to that of a customer or customer device lie beyond a boundary that lies in between. It is contemplated that, in some embodiments, such authorized devices may connect with customer assets across a public network (and thus not necessarily co-located with other customer devices), but still be included as an authorized device due to implemented trust mechanisms, e.g., by encrypting the public network connection using a virtual private network or similar securing mechanism. It will be appreciated that, as previously mentioned, such devices may include virtual resources such as those of distributed computing system 106.

In some embodiments, the service uses the virtualized instance to determine, by at least processing the received rules, a policy that is thereupon propagated to some or all authorized and/or customer devices. Such a policy may, for example, be provided to various devices as part of regularly scheduled maintenance, via a policy push by a system management system, upon association and/or connection with a different customer device (e.g., upon establishing a VPN connection), and/or manually. The policy, in some embodiments, includes instructions that, when implemented, causes the affected device to retrieve and/or redirect all or some data or network traffic that would otherwise be directed via a direct network connection (e.g., the public network connection 112) to the virtualized resource of the distributed computing system that provides the service. In some embodiments, multiple policies may be generated and propagated, for example, to address different alteration schemes, device types, and/or scenarios. In alternate embodiments, a single policy addresses all specified rules. The policy may, in some embodiments, be determined from the rules by considering the characteristics of the devices involved, the nature of the data, the volume and/or resources of the distributed computing system that are required to implement the rules, and other factors.

Upon implementation of the policy across some or all devices, it will be appreciated that a portion of data transiting across the aforementioned boundary will instead be routed through the distributed computing system implementing the service, in particular the virtualized instance. Such redirected data is processed, in some embodiments, by the virtualized instance according to the received rules. The virtualized resource may configure the data in one of a large plurality of ways, including packet mangling techniques to achieve the effects specified by the rules. As the rules are customer-specified, the data may be configured for a large number of applications. Some examples include rules that enable anonymous browsing or access to external devices (e.g., by stripping cookies, user agents or other personally identifiable information within the data stream), transparent language translation, restriction or redirection of traffic according to defined quotas, code sanitization (e.g., processing transiting code to comply with industry standards), watermarking of images, data compression (either lossless or lossy), UTF-8 inbound canonicalization, differentiation of transmitted and/or received data based on geographic location(s) of one or more of the customer devices or external devices, caching and/or de-duplication (e.g., to improve performance and/or throughput), government or regulatory compliance (e.g., PCI DSS, destination-dependent government data import/export requirements, obscenity and/or morality filters, insertion of third party certifications and the like), content filtering (e.g., with respect to a set of published signatures), distributed denial of service (DDoS) mitigation (e.g., rules may be written, generated and/or implemented in accordance with a given volume of traffic), security filtering and pattern-based vulnerability mitigation (e.g., protection from SQL injection), selective filtering of network traffic (e.g., filtering traffic in one direction of a given data stream based at least in part on content previously received in the opposing direction, such as an automated cross-site scripting (XSS) mitigation scheme that detects and filters hypertext markup language (HTML) code in outbound traffic that matches content in an associated inbound request) and many other transformative cases. In some embodiments, the rules may be operable to cause certain actions to occur within the customer environment, e.g., upon at least a subset of customer devices. Such actions may include tripping of warnings or alarms, propagation of notifications, augmentation of data streams within the customer environment, quarantining or termination of unresponsive or otherwise malfunctioning customer devices, modification of the rules themselves, and many other types of actions. As will be appreciated, rules, and thus the associated data modification, may include both the restriction and augmentation of flowing data, depending on the nature of the rules. In embodiments where multiple rules are specified, duplicate and/or overlapping rules may be combined in order to save resources, improve latency and decrease processing time and/or cost.

In some embodiments, the rules may be operable to cause a distributed computing system or customer environment to recognize that multiple subsets of resources thereof are capable of processing data according to the rules. In some of such embodiments, a first subset of resources applies a first transformation to data according to the implemented rules. Additionally, a second (or greater) subset of resources applies a second (or greater) transformation to the data in accordance with the rules. The data may flow to the disparate subsets of resources in parallel, in sequence, or in some combination thereof. In some embodiments, the second (or greater) transformation may include injecting an additional executable instruction into the data stream, or possibly installing another (or the same) rule to be implemented by the second (or greater) subset of resources. In some embodiments, the second (or greater) subset of resources caches a portion of the data transiting it in accordance with the implemented rule, and the first subset of resources is configured to deduplicate the cached data, such as by replacing data in the data stream with the corresponding data cached by the second resources. In some embodiments, the first subset of resources replaces at least some of the transferred and/or cached data, such as data cached by the second or greater subset of resources, with cache identifiers, placeholders, or pointers indicating that such data has been cached. In some embodiments, the second or greater subset of resources inverts the transformation effected by the first subset of resources, e.g., by re-inserting at least some of the data replaced by cache identifiers and the like. In such embodiments, the inversion of the transformation may be triggered by, or at least influenced by, characteristics of the received data in the data stream and/or in the cache. Such techniques, as may be utilized in a wide area network (WAN) optimization scheme or other bandwidth optimization and/or caching scheme, may be transparently or specifically implemented in order to decrease network traffic, decrease latency, and improve performance of applications requiring data to transit high-cost and/or capacity limited uplinks, including, for example, cellular or wireless data networks. Such techniques may also decrease traffic, latency, etc. from poorly implemented software or hardware solutions that fail to cache data independently.

Costs incurred to process the rules (e.g., by resource usage, per implemented rule, and/or by data volume and/or network traffic processed), including generation and propagation of the associated policy, may be tracked in a manner that allows the requesting customer to be billed for such usage. In such embodiments, accounting records may be updated, and in some embodiments, when an existing allocation or virtual resource under control of the customer is used to implement the service, such records and tracked usage may be used to adjust the amount charged to the customer for the virtual resource or allocation already in their possession. Other metrics may be tracked, such as those associated with traffic matching an implemented or unimplemented rule or set of rules. Such metrics may be exposed to the customer, a managed data transformation provider, and/or the distributed computing resource provider (e.g., to be used internally to improve efficiency of operations thereof).

Figure 2:
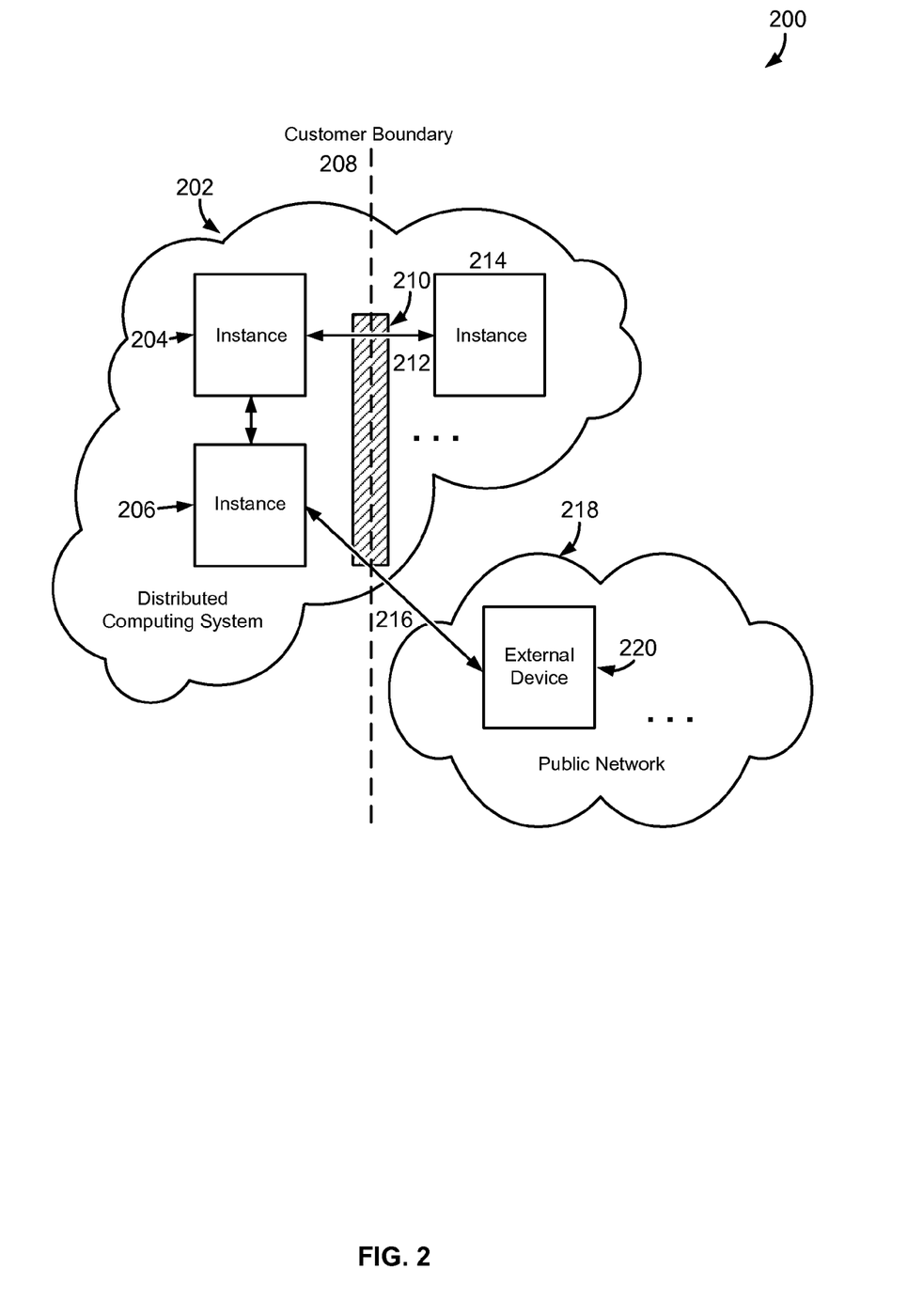
FIG. 2 shows an illustrative example of an environment having a flexibly configurable data alteration service in accordance with at least one embodiment.

FIG. 2 illustrates an example distributed computing environment 200 having a distributed computing system 202, which in some embodiments may include the distributed computing system 106 of FIG. 1, and implementing a data alteration service. In the example illustrated, the distributed computing system includes virtualized customer resources 204, 206, e.g., instances, which in some embodiments may be similar to the virtual resources 118 described in connection with FIG. 1, and may in some embodiments also be customer devices 102 or components thereof 114, also as described in connection with FIG. 1. The physical resources from which the virtual resource is abstracted is intentionally omitted in the illustration in order to emphasize the obfuscation of such physical resources from, e.g., customers. The virtualized customer resources may be networked together, and in some embodiments, may be segregated from other virtualized resources of the same distributed computing system. In some embodiments, the virtualized customer resources may be connected via a virtual private network (VPN) connection to other customer devices, e.g., the customer device 102 or constituents 114 described in connection with FIG. 1.

Data transiting across customer boundary 208 may, in whole or part as defined by customer rules or policies (e.g., the customer rules and policies described in connection with FIG. 1), be processed in a similar manner as described in connection with FIG. 1, e.g., using a virtualized resource 210. In the illustrated example, the customer boundary traverses between virtualized resources under control of the customer 204, 206 and other virtualized resources 214 of the same distributed computing system 202. The virtualized resource performing the data processing 210 may, as alluded to above, be a separate virtualized resource from that of a customer, may be bound to or otherwise associated with a customer, or may in some embodiments be an existing virtualized resource that is already associated with a customer. The data processing itself may occur on a portion of data redirected to the virtualized resource, as described in connection with FIG. 1, or the implementing virtualized resource may, based on the rules and/or policies previously described, detect in situ that data flowing through pre-existing mechanisms should be processed without the need for such redirection. In some embodiments, a combination of the approaches may be employed. For example, rules and/or derived policies may specify that data directed to, or originating from, certain devices or device types should be altered in a prescribed way. In such embodiments, the implementing virtualized resource may only redirect and/or process the subset of data to which the rules would apply, based, e.g., upon information received from listeners, connected devices, predictive mechanisms such as data pattern recognition, and the like. Such processing may apply to any set of data crossing the aforementioned boundary, e.g., via data connection 212 to the virtual resource 214, or, in some embodiments, to external device 220, e.g., Web hosts or application servers, outside of the distributed computing system via network connection 216 to external networks 218 (such as the Internet and/or to other distributed computing systems).

Although the virtualized resource performing the data processing is illustrated as straddling the customer boundary, such location is meant to be merely illustrative. Such a resource may, by virtue of being virtualized, be associated with physical resources located anywhere along, e.g., a network topology, and not necessarily on an external edge of such a topology. Additionally, the illustrated customer boundary is conceptual in nature, and does not necessarily require an implemented barrier, such as a firewall. For example, virtualized resources outside the control of the customer requesting the services (e.g., virtualized resource 214) may, in some embodiments, be under control of a different customer of the distributed computing system. A policy, such as the policy described in connection with FIG. 1, may, in some embodiments, be pushed out to precisely the set of resources under a given customer's control, and not to resources outside of said customer's control (e.g., even those springing from or associated with the same system, such as the virtualized resource 214, and not otherwise segregated from one another). However, the customer boundary may, in some embodiments, defined at least in part by other well-known techniques used for segregating certain resources, either virtual or physical, from one another. In some embodiments, the boundary itself is configurable, e.g., by a customer, a third party such as a managed data transformation provider, and/or by the distributed computing system. Managed data transformation providers include any provider of data-related services that use data transformation techniques, including but not limited to any of those described in connection with FIG. 1. Such managed data transformation providers may, in some embodiments, also request rules for implementation, e.g., on behalf of a customer requesting the aforementioned data transformation services as may be provided by managed data transformation providers. In embodiments where managed data transformation providers provide rules, services, boundaries and the like, such rules, services and boundaries may be associated with a defined pricing structure (e.g., per rule selected, implementing resource used, and/or data amount processed) wherein associated costs for such managed data transformation providers accrue to the customer's account, rather than that of the managed data transformation provider. In such embodiments, an additional rule may be implemented (e.g., by the managed data transformation provider and/or the distributed computing system) to redirect payments, upon remittal from the customer, to the managed data transformation provider.

Figure 3:
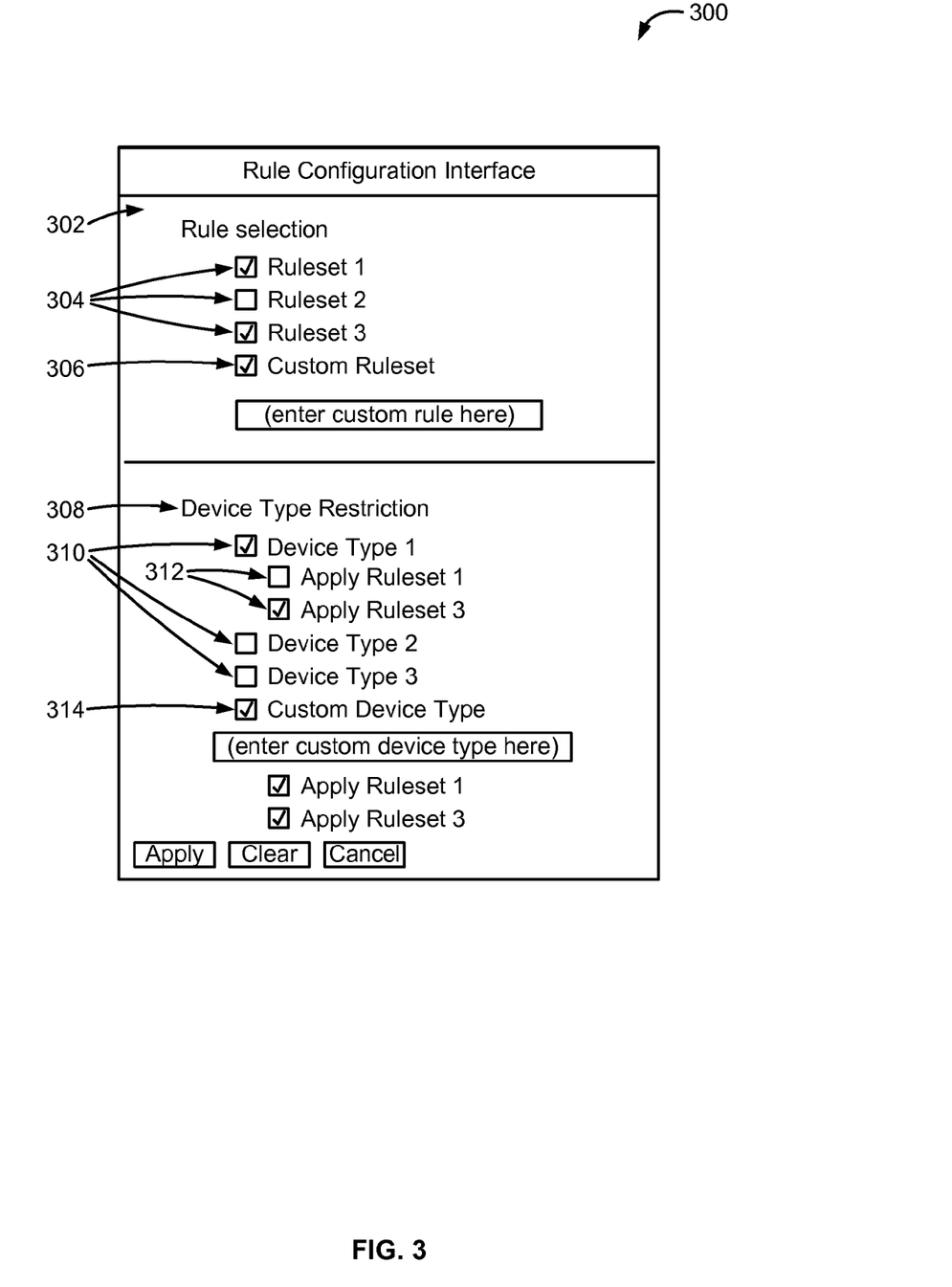
FIG. 3 shows an illustrative example of an interface for configuring and/or requisitioning data modification rules in accordance with at least one embodiment.

FIG. 3 illustrates an example user interface (UI) 300 for selecting and defining rules. As previously mentioned in connection with at least FIG. 1, a customer may define rules and provide them to, e.g., the provider of the implementing distributed computing system or the data modification service, by a number of techniques. Such techniques, as previously alluded to, include submission and configuration using an application programming interface (API) or a user interface (UI). In some embodiments, the UI may be provided by the provider of the service, in some embodiments also the provider of the implementing distributed computing system, and presented to a requesting customer at the time of requisitioning. Such requisitioning may be specific to the service, or may be integrated into the requisitioning process for other products and services provided by the distributed computing system provider or the service provider.

An illustrated example UI 300 is shown. The UI may be used for initial requisitioning, configuration after initial requisitioning, or both. The rule selection portion 302 allows a customer to select among predetermined rule sets 304 or define a customer rule set 306. The predetermined rule sets may be preconfigured for ease of selecting common data transformation regimes and applications, including those examples provided above in connection with FIG. 1. The custom rule set, as previously mentioned in connection with at least FIG. 1, may be defined in any manner prescribed by the service provider and for which the underlying distributed computing system or implementing virtual instance is configured to receive. Such defined custom rule sets may be preserved for ease of future access, e.g., by being presented as a different "predetermined" rule set for selection upon subsequent visits to the UI.

In the example given, a device type restriction portion 308 is also shown. From this portion of the UI, the customer may select among predetermined device types 310 to which one or more selected rule sets 312 may apply. Such device types may be separate using any appropriate criteria. For example, one device type may include mobile devices, while another may include virtualized instances. Each selected device type may be subject to any number of rule sets selected in the rule selection portion described above. Additionally, the customer may define a custom device type 314 in a fashion similar to that of a custom rule set, also as described above. Such additional device types may be displayed in a drop-down, e.g., of all other device types known to the system, or defined manually. Upon completing selection, the customer's selections are passed to the implementing entity, e.g., the virtualized resource, for implementation, reconfiguration, and/or further processing.

Figure 4:
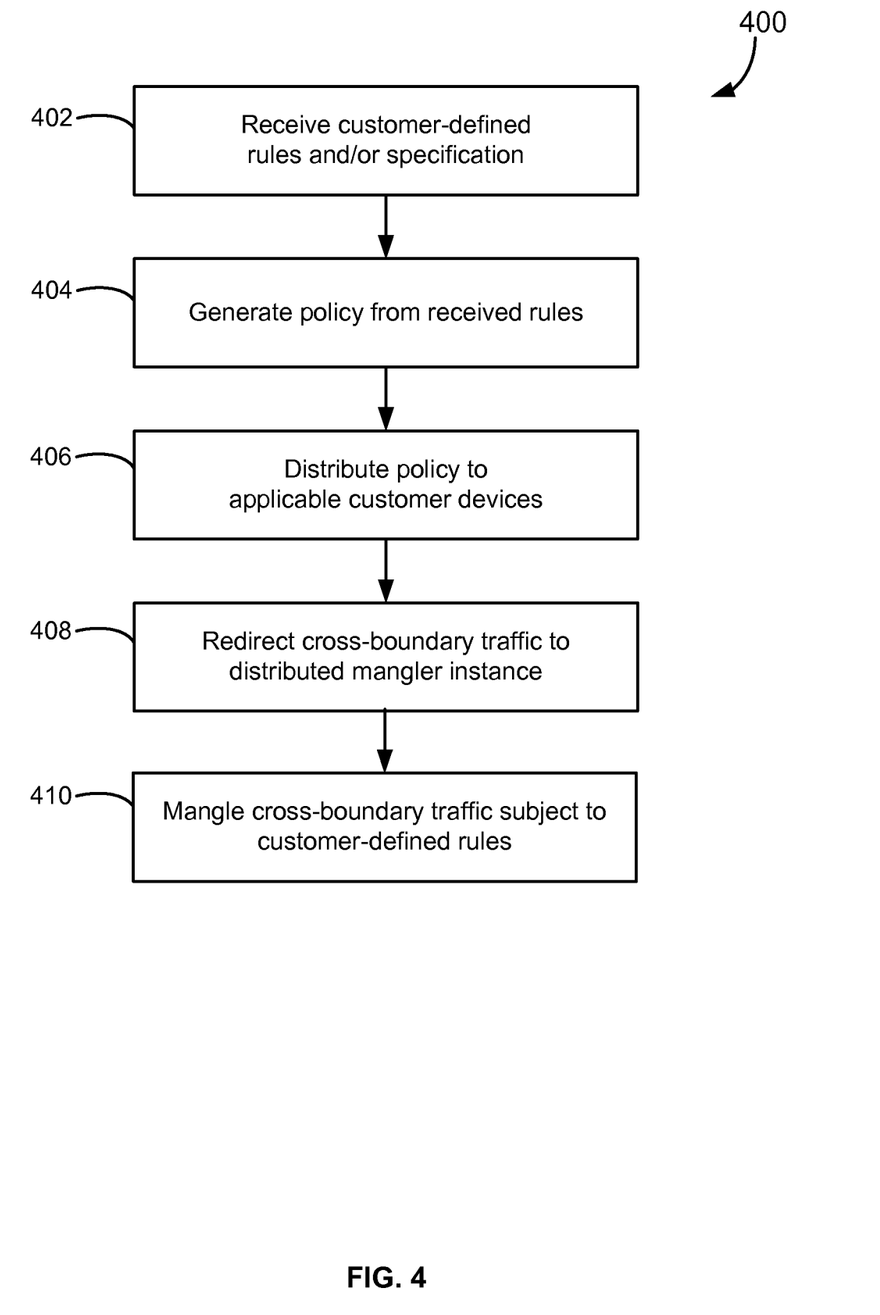
FIG. 4 shows an illustrative example of a process for modifying network traffic in accordance with at least one embodiment.

FIG. 4 illustrates an example process 400 for implementing customer-defined rules across resources of a distributed computing system, in accordance with at least one embodiment. Some or all of the process 400 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

In some embodiments, such as those shown and described in connection with FIGS. 1 and 2, a data alteration service provider or associated distributed computing system (e.g., the distributed computing system 106) receives customer-defined rules and/or a customer's specification of desired effect(s) upon transiting data 402. As previously described, such rules may be received using a number of techniques, such as the UI shown and described in connection with FIG. 3. The system or provider thereupon generates a policy from the received rules 404, using, e.g., a virtualized instance 118, 210 of the distributed computing system. At a time after generating the policy, the policy is distributed to some or all customer devices 406, e.g., on the customer side of a customer boundary 208. Such distribution may be effected using a number of techniques, including those previously described in connection with at least FIGS. 1 and 2 (e.g., using system management techniques or login scripts). The policy may, in some embodiments, cause the affected customer devices to retrieve and redirect data transiting across the boundary to the entity employed to perform the data transformations specified by the rules 408. As previously discussed, the entity may be a virtualized resource or instance of a distributed computing system. Once the entity has access to the target data, the cross-boundary data is then processed 410 using, e.g., packet mangling techniques, in order to implement the rules. Although packet mangling has been provided as an example of such techniques, other transformation techniques, including those described in connection with at least FIG. 1, may be employed.

Figure 5:
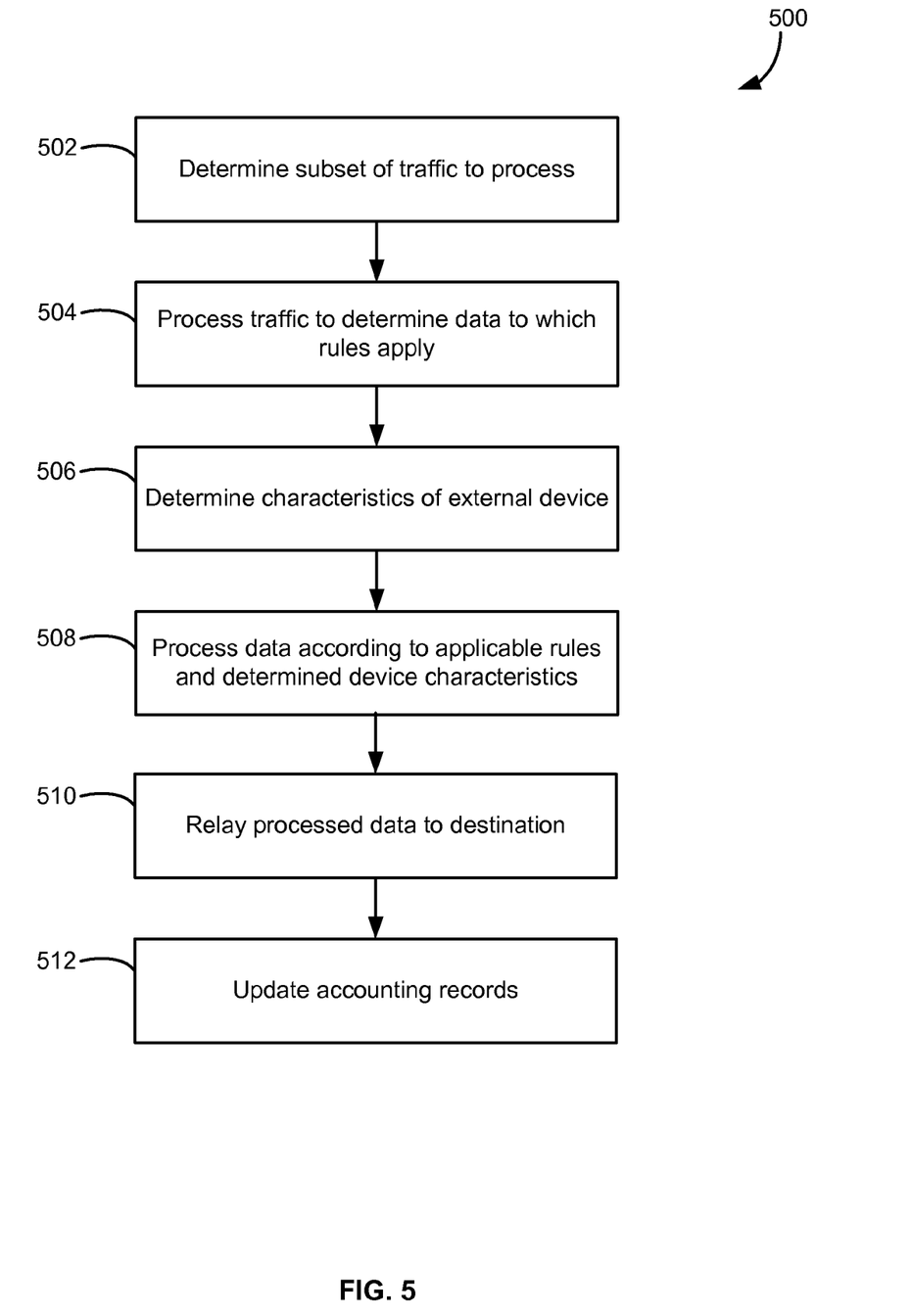
FIG. 5 shows an illustrative example of a process for implementing data modification rules in accordance with at least one embodiment.

FIG. 5 illustrates an example process 500 for altering data in accordance with customer-defined rules, in accordance with at least one embodiment. As will be contemplated, example process 500 may incorporate, or be incorporated in, some or all aspects of at least process 400. Upon receiving customer-defined rules according to various techniques, some of which are described in connection with at least FIGS. 1 through 4, a subset of transiting data (e.g., network traffic) is determined for processing according to the received rules 502, for example in accordance with an implemented policy described in connection with at least FIGS. 1-3 and 4. The subset of data is then processed to determine the specific data to which the received rules apply 504. Techniques used for determining the subset of data for processing are exemplified in connection with, e.g., FIG. 2. In embodiments where the rules or desired effects on transiting data (e.g., network traffic) are dependent upon or sensitive to one or more characteristics of a connecting external device to or from which the data is transiting, the characteristics of the external device, or device types, are determined 506. Applicable techniques may be employed in response to the device type restrictions described in connection with the UI of FIG. 3, and characteristics of external devices may include, for example, connection speed, connecting system type, geographic or network location, latency, and any other device characteristic supported by the service and/or specified by the customer, e.g., via an API or UI. The determined data is then processed, by techniques previously discussed in connection with at least FIGS. 1-2 and 4, according to the applicable rules and determined device characteristics 508. The processed (e.g., augmented, compressed, destructively compressed, scrubbed, or otherwise modified) data is thereon relayed to its intended destination 510, for example a customer device 102, its constituents 114, a virtualized customer resource 204, 206, an external device 110, 220, and/or a virtualized resource 214 beyond customer boundary 208. Accounting records are optionally updated 512, for example, to reflect monetary charges to the customer and/or, e.g., processing time used, such as described in connection with at least FIG. 1.

Figure 6:
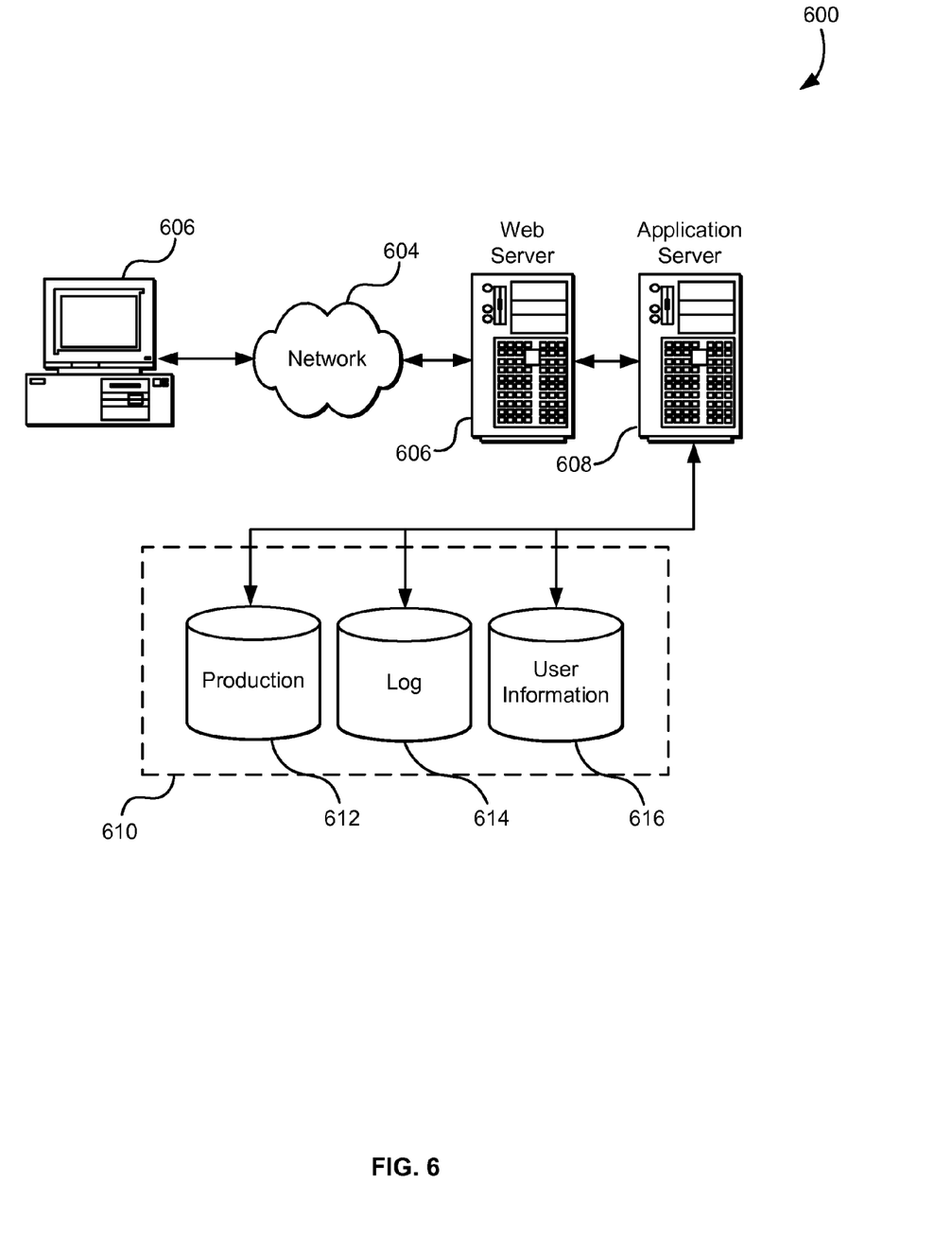
FIG. 6 illustrates an environment in which various embodiments can be implemented.

FIG. 6 illustrates aspects of an example environment 600 for implementing aspects in accordance with various embodiments. As will be appreciated, although a Web-based environment is used for purposes of explanation, different environments may be used, as appropriate, to implement various embodiments. The environment includes an electronic client device 602, which can include any appropriate device operable to send and receive requests, messages, or information over an appropriate network 604 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 606 for receiving requests and serving content in response thereto, although for other networks an alternative device serving a similar purpose could be used as would be apparent to one of ordinary skill in the art.

The illustrative environment includes at least one application server 608 and a data store 610. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 602 and the application server 608, can be handled by the Web server. It should be understood that the Web and application servers are not required and are merely example components, as structured code discussed herein can be executed on any appropriate device or host machine as discussed elsewhere herein.

The data store 610 can include several separate data tables, databases, or other data storage mechanisms and media for storing data relating to a particular aspect. For example, the data store illustrated includes mechanisms for storing production data 612 and user information 616, which can be used to serve content for the production side. The data store also is shown to include a mechanism for storing log data 614, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 610. The data store 610 is operable, through logic associated therewith, to receive instructions from the application server 608 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:
   receiving, through a programmatic interface, a request to apply customer-defined rules on at least a subset of data transiting between at least a first set of computing resources programmatically managed by a customer of a computing resource provider and a second set of computing resources outside of control of the customer, the first set of computing resources being from a plurality of sets of computing resources, at least some of which are remotely and programmatically managed by different customers;
   receiving a request to apply upon transiting data at least one data transformation technique provided by a managed data transformation provider that is external to the computing resource provider; and
   configuring at least the first set of computing resources to implement a policy derived based at least in part on the received customer-defined rules, to cause the transiting subset of data to pass to a third set of computing resources of the computing resource provider that applies the customer-defined rules to the subset of data prior to reaching the second set of computing resources which are outside of control of the customer, with at least a portion of the transiting subset of data processed in accordance with at least one rule provided by the managed data transformation provider and the rule associated with the requested data transformation technique.

2. The computer-implemented method of claim 1, wherein the third set of computing resources is programmatically managed by the computing resource provider.

3. The computer-implemented method of claim 1, further comprising:
   providing, to the customer, a plurality of predefined selectable rules; and receiving, from the customer, information identifying at least: a selection of rules from the plurality of predefined rules, the information thereby identifying customer-defined rules; and the request to apply the customer-defined rules.

4. The computer-implemented method of claim 1, wherein at least one of the second set of computing resources includes one or more devices that are physically separate from. the computing resource provider.

5. The computer-implemented method of claim 1, wherein the customer- defined rules are composed by the customer using a rule notation supported by a rule definition platform provided by the computing resource provider.

6. me computer-implemented method of claim 1, further comprising applying the customer-defined rules to the subset of data at a time after determining that the subset of data is transiting between the first set of computing resources and the second set of computing resources.

7. A computer-implemented method to modify data streams, comprising:
   receiving, through a programmatic interface, a request to apply customer-defined rules on data transiting across a customer-defined boundary that is between at least a first resource under control of a customer of a computing resource provider and a second resource that is outside of control of the customer, the first resource programmatically managed by the customer and being from a plurality of resources at least some of which are remotely and programmatically managed by different customers of the computing resource provider;
   receiving a request to apply upon transiting data at least one data transformation technique provided by a managed data transformation provider that is external to the computing resource provider; and configuring at least the first resource to implement a policy derived based at least in part on the customer-defined rules to cause at least a portion of the transiting data to be processed by a third resource in accordance with the customer-defined rules prior to reaching the second resource, and at least a second portion of the transiting data processed in accordance with at least one rule provided by the managed data transformation provider associated with the requested data transformation technique and the computing resource provider.

8. The computer-implemented method of claim 7, wherein the customer-defined rules are received from the customer that selects the rules from a predetermined plurality of rule sets using at least one of a user interface (UI) or an application programming interface (API) exposed to the customer.

9. The computer-implemented method of claim 7, wherein the second resource is under control of a second customer of the computing resource provider.

10. The computer-implemented method of claim 7, wherein: at least one of the first resource or the second resource comprises one or more devices of the computing resource provider; and at least one of the first resource or the second resource is a device that is physically separate from the computing resource provider.

11. The computer-implemented method of claim 7, wherein the third resource is a subset of the first resource.

12. The computer implemented method of claim 7, further comprising configuring the first resource to implement a policy derived at least in part from the received customer-defined rules, the policy being implemented to configure a plurality of customer-controlled resources associated with the transiting data.

13. The computer-implemented method of claim 7, wherein the managed data transformation provider-provided rules include at least one rule that, when processed, causes at least a portion of customer-charged costs to be remitted to the managed data transformation provider, the customer-charged costs accruing to the customer in accordance with a pricing structure associated with the managed data transformation provider-provided rules.

14. A computer system comprising:
one or more processors; and
memory, including instructions executable by the one or more processors to cause the computer system to at least:
configure resources of the computer system such that the resources are capable of being simultaneously associated with a plurality of customer devices that are programmatically managed by respective customers of a computing resource provider;
process customer-specified rules, defined through a programmatic interface, to generate a policy, the customer-specified rules defining at least one alteration to be applied to data transferred between at least one customer device among the plurality of customer devices, and an external device that is outside of control of the customer;
provide the policy to the at least one customer device such that the system is configured to implement the customer-specified rules using at least a subset of the configured resources; and.
implement the customer-specified rules to cause the at least one alteration to be applied to the transferred data by another device prior to the transferred data reaching the external device.

15. The computer system of claim 14, wherein the customer-specified rules are implementable to alter at least a subset of the transferred data such that the transferred data complies with one or more content requirements of a recipient of the data.

16. The computer system of claim 14, wherein the customer-specified rules, when implemented, cause at least one action to be taken by the system upon at least a subset of the plurality of customer devices.

17. The computer system of claim 14, wherein the external device is connected to the customer device across a public network.

18. The computer system of claim 14, wherein the customer-specified rules include at least one subset of rules that, when implemented, restrict the transferred data based at least in part on a geographic location of the external device.

19. The computer system of claim 14, wherein the instructions cause the computer system to further:
process the policy to determine, among the plurality of customer devices, the at least one customer device that is subject to the at least one restriction; and
at a time after providing the policy to the at least one customer device, redirect the transferred data to the at least the subset of configured resources such that the at least the subset implements the customer-specified rules.

20. The computer system of claim 14, wherein:
the subset of the configured resources is a first subset of configured resources;
the alteration is a first alteration that is applied by the first subset of configured resources: and
the customer-specified rules include a subset of rules that, when implemented, cause a second subset of configured resources to implement the subset of rules such that a second alteration is applied to the transferred data, the second subset of configured resources being recognized by the computer system as operable to apply the subset of rules.

21. The computer system of claim. 20, wherein the second alteration includes at least one of augmenting the transferred data with an executable instruction or implementing an additional customer-specified rule using the second subset of configured resources.

22. The computer system of claim 20, wherein:
the second subset of resources caches at least a subset of the transferred data to result in cached data;
the first subset of resources replaces at least a portion of the subset of transferred data with at least one cache identifier; and
the second subset of resources replaces the at least one cache identifier with at least a portion of the cached data.

23. The computer system of claim 14, wherein the instructions cause the computer system to further generate metrics associated with the transferred data subject to the customer-specified rules.

24. The computer system of claim 14, wherein the instructions cause the computer system to further accrue costs associated with the processing of the customer-specified rules to the customer.

25. The computer system of claim 24, wherein the costs are accrued based at least in part on a level of resources of the computer system used to process the transferred data.

26. The computer system of claim 24, wherein the costs are accrued based at least in part on an amount of the transferred data subject to the customer-specified rules.

27. The computer system of claim 24, wherein the costs are accrued based at least in part on a quantity of the customer-specified rules applied to the transferred data.

28. One or more non-transitory computer-readable storage media having collectively stored thereon executable instructions that, if executed by one or more processors of a computer system, cause the computer system to at least:
- adapt resources of the computer system such that the adapted resources are capable of at least being simultaneously connected to a plurality of customer devices, the plurality of customer devices including at least some customer devices remotely and programmatically managed by different customers of a computing resource provider;
- in response to receiving, through a programmatic interface, information specifying customer-defined rules for modifying a subset of network traffic transiting between at least one customer device programmatically managed by a customer of the computing resource provider and at least one external device outside of control of the customer, determine the at least one customer device associated with the subset of network traffic;
- configure the at least one customer device to cause the subset of network traffic to be redirected to at least one adapted resource among the adapted resources; and
- process, using the at least one adapted resource, the redirected subset of network traffic such that the traffic is modified in accordance with the customer-defined rules prior to reaching the at least one external device.

29. The non-transitory computer-readable storage media of claim 28, Wherein the executable instructions further cause the computer system to process the subset of network traffic at a time after determining that the subset of network traffic either originates from or is destined to the external device.

30. The non-transitory computer-readable storage media of claim 28, wherein the executable instructions further cause the computer system to, in accordance with a subset of the received customer-defined rifles, process the subset of network traffic in accordance with determined characteristics of the external device.

31. The non-transitory computer-readable storage media of claim 28, wherein: the customer device includes a first adapted resource among the adapted resources, the first adapted resource being under control of a first customer of the computer system; and the external device includes a second adapted resource among the adapted resources, the second adapted resource being under control of a second customer of the computer system.

32. The non-transitory computer-readable storage media of claim 28, wherein the processing of the redirected subset of network traffic compresses the network traffic.

33. The non-transitory computer-readable storage media of claim 28, wherein the executable instructions further cause the computer system to process only a portion of the redirected subset of network traffic that is relevant to the customer-defined rules.

* * * * *